United States Patent
Zhan (10) Patent No.: US 7,235,903 B2
(45) Date of Patent: Jun. 26, 2007

(54) STEP MOTOR HAVING STATOR WITH SEPARATED STRUCTURE

(75) Inventor: Jian-Gui Zhan, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 99 days.

(21) Appl. No.: 11/173,012

(22) Filed: Jun. 30, 2005

(65) Prior Publication Data

US 2006/0055279 A1 Mar. 16, 2006

(30) Foreign Application Priority Data

Sep. 14, 2004 (TW) .............................. 93127732 A (51) Int. Cl.
*H02K 37/14* (2006.01)
*H02K 5/07* (2006.01)
*H02K 1/12* (2006.01)

(52) U.S. Cl. ...................... 310/49 R; 310/257; 310/91
(58) Field of Classification Search ................ 310/194, 310/49 R, 254, 257, 90, 91
See application file for complete search history.

(56) References Cited

U.S. PATENT DOCUMENTS 5,886,438 A * 3/1999 Kawanishi ................... 310/90
6,255,749 B1 * 7/2001 Aoshima et al. ........... 310/49 R
6,909,208 B2 * 6/2005 Suzuki et al. .............. 310/49 R
2005/0236914 A1 * 10/2005 Horiike ..................... 310/49 R

FOREIGN PATENT DOCUMENTS

| JP | 55074348 A | * 6/1980 | ............... 310/49 R |
| TW | 464131 | 11/2001 | |
| TW | 579144 | 3/2004 | |

* cited by examiner

*Primary Examiner*—Tran Nguyen
(74) *Attorney, Agent, or Firm*—Merchant & Gould P.C.

(57) ABSTRACT

A step motor includes a spindle, a magnet unit mounted around the spindle, and a stator assembly sleeved over the magnet unit. The stator assembly includes at least one coil-and-yoke unit having a coil support, a coil wound around the coil support, and a pair of magnetic yokes mounted in the coil support. The stator assembly further includes an outer tube sleeved over the coil-and-yoke unit. A fixing plate and a cover unit are mounted to opposite ends of the stator assembly. The spindle is journalled in the fixing plate and the cover unit. The coil support includes a surrounding wall having notches formed in an inner circumferential surface thereof and angularly spaced apart at equal intervals. Each of the magnetic yokes includes excitation fingers inserted in the notches. The excitation fingers of the magnetic yokes are interdigitated.

11 Claims, 8 Drawing Sheets

STEP MOTOR HAVING STATOR WITH SEPARATED STRUCTURE

CROSS-REFERENCE TO RELATED APPLICATION

This application claims priority of Taiwanese Application No. 093127732, filed on Sep. 14, 2004.

BACKGROUND OF THE INVENTION

1. Field of the Invention

The present invention relates to a step motor, more particularly to a step motor having a stator with a separated structure.

2. Description of the Related Art

Figure 1:
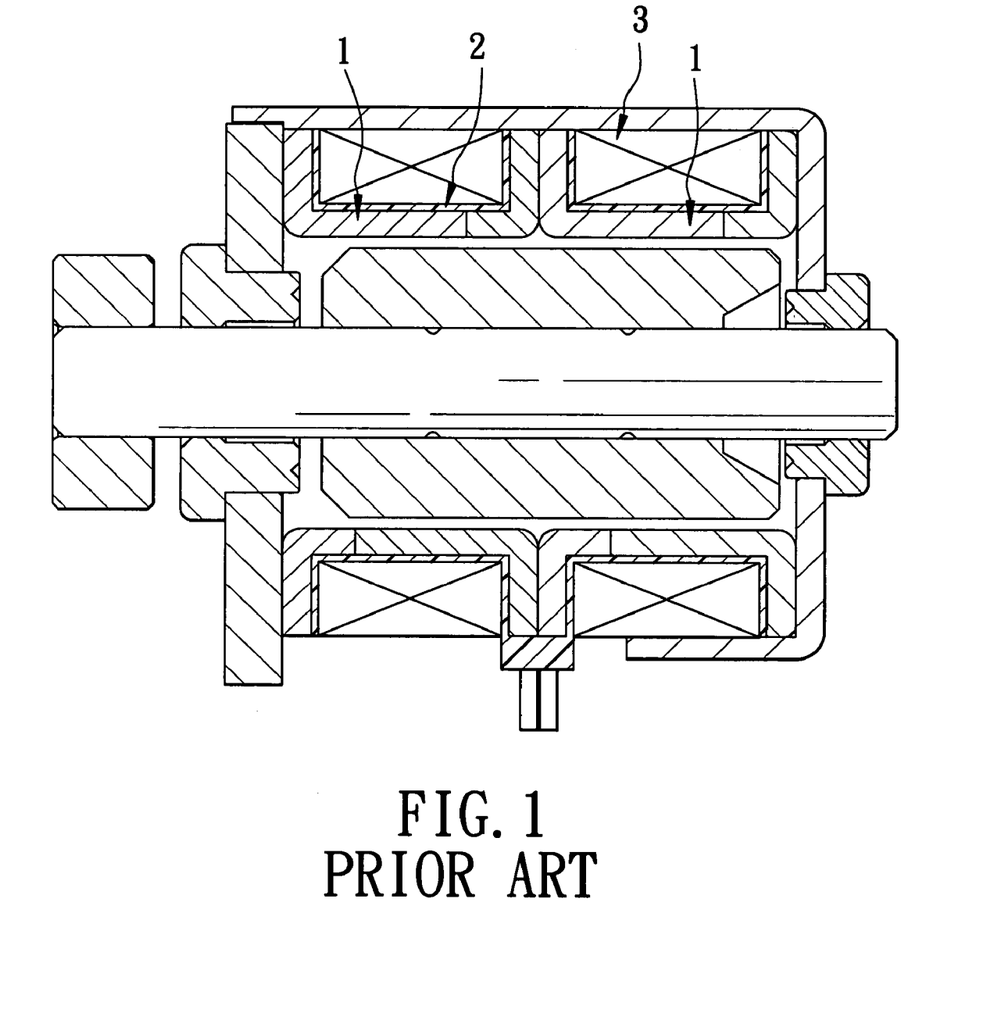
FIG. 1 is a sectional view of a conventional step motor, in which magnetic yokes and coil supports of a stator are integrally connected.

FIG. 1 shows a conventional step motor, in which magnetic yokes and coil supports of a stator are integrally connected. In more detail, the stator includes at least a pair of magnetic yokes 1, each mounted in opposition to one another one of the magnetic yokes 1 and centered about a motor axis, a pair of coil supports 2 covering respectively outer surfaces of the magnetic yokes 1, and coil members 3 wound respectively around the coil supports 2. Manufacture of the stator involves first assembling the magnetic yokes 1, then placing the assembled magnetic yokes 1 in a mold to form the coil supports 2 using a plastic material. Such a process is complicated and involves high costs. In addition, the mold itself needs to be designed and produced, further increasing overall complexity and manufacturing costs.

Figure 2:
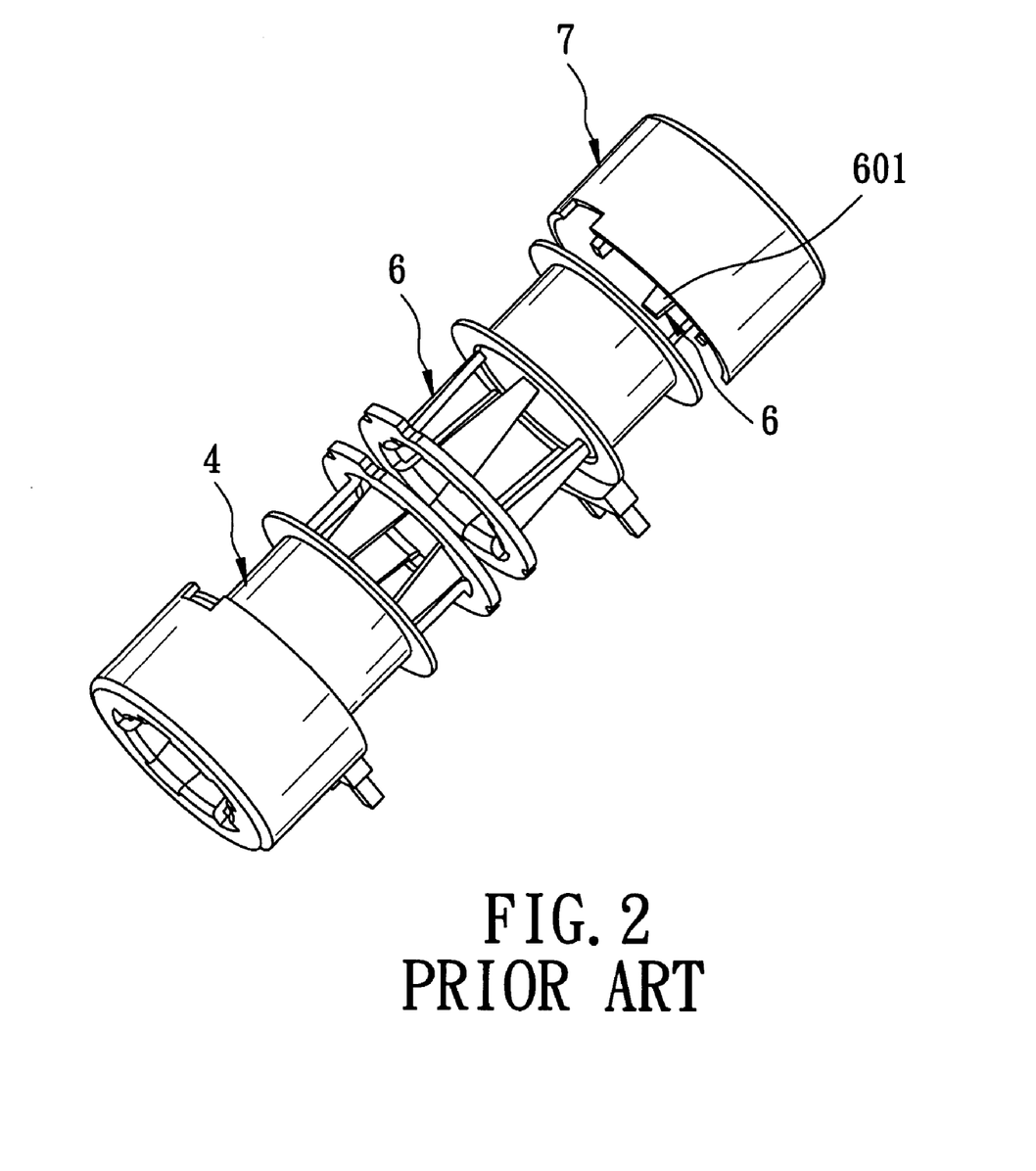
FIG. 2 is an exploded perspective view of a conventional stator, in which magnetic yokes and outer cylinders are integrally formed.
Figure 3:
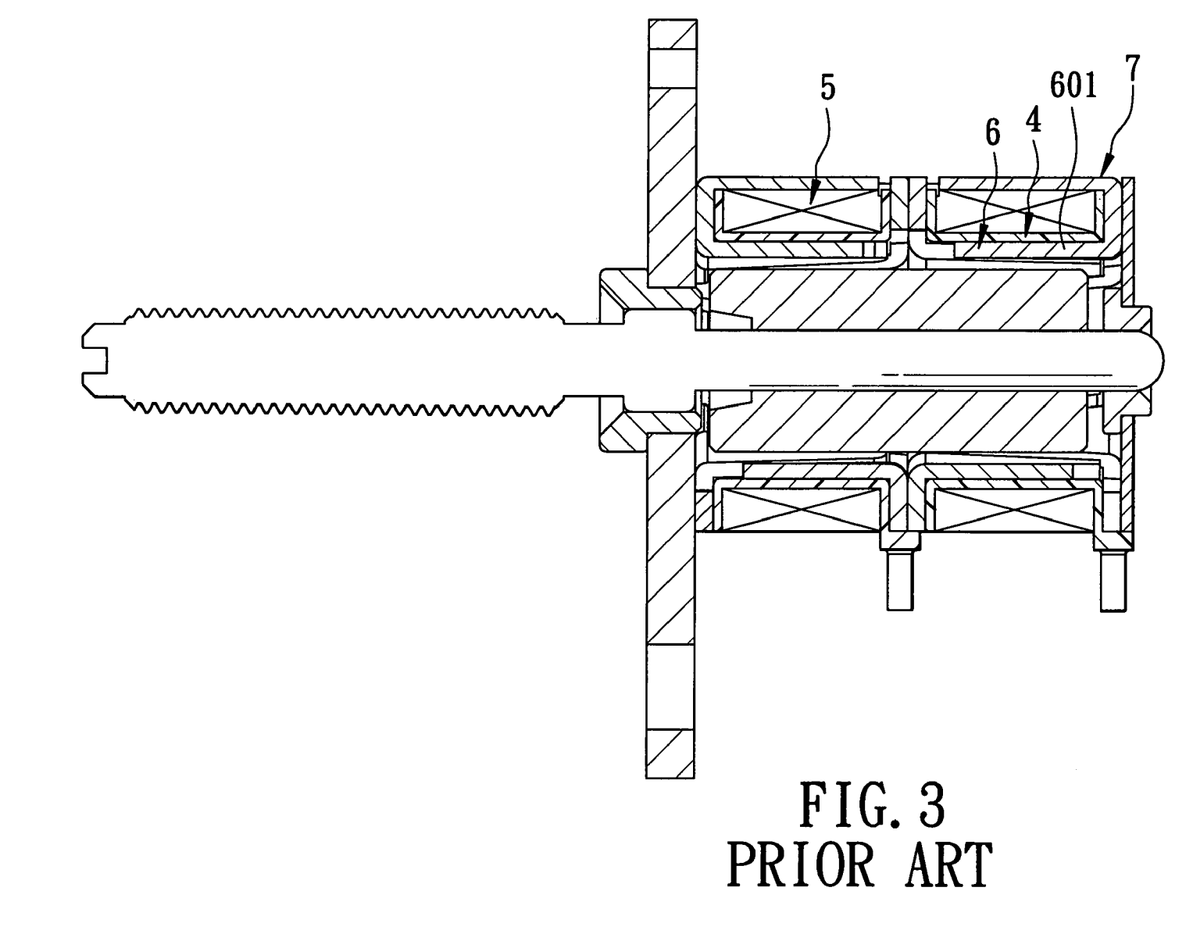
FIG. 3 is an assembled sectional view of a step motor utilizing the stator of FIG. 2.

FIGS. 2 and 3 show another conventional stator for a step motor, in which magnetic yokes and outer cylinders are integrally formed. In more detail, the stator includes a pair of coil supports 4, a pair of coils 5 wound respectively around the coil supports 4, two pairs of magnetic yokes 6, and a pair of outer cylinders 7 mounted around the coil supports 4. The innermost two magnetic yokes 6 are inserted respectively into the coil supports 4, whereas the outermost two magnetic yokes 6 are formed integrally and respectively with the outer cylinders 7.

Although this structure allows for direct assembly of the stator that does not involve molding processes, since the outermost pair of the magnetic yokes 6 and the outer cylinders 7 have an integral structure, and the resulting cross section of the integrated magnetic yokes 6 and outer cylinders 7 is U-shaped (see FIG. 3), performing drawing processes for forming these integral elements is difficult. Furthermore, finishing processes are typically performed following drawing to obtain a more precise ratio between a sectional area and a length of excitation fingers 601 of the magnetic yokes 6. The integral structure makes the finishing processes difficult to perform.

SUMMARY OF THE INVENTION

The object of this invention is to provide a step motor with a separated stator structure, in which an insertion/sleeved configuration is used to realize secure and simple assembly between magnetic yokes and coil supports of the stator.

The step motor of this invention comprises: a spindle that extends along a motor axis; a magnet unit mounted around the spindle; a stator assembly sleeved over the magnet unit and having opposite ends, and including at least one coil-and-yoke unit having a coil support, a coil wound around the coil support, and a pair of magnetic yokes mounted in opposition to each other in the coil support, the stator assembly further including an outer tube sleeved over the coil-and-yoke unit; a fixing plate mounted to one of the ends of the stator assembly, and in which the spindle is journalled; and a cover unit mounted to another one of the ends of the stator assembly opposite to the fixing plate, and in which an end portion of the spindle is journalled.

The coil support includes a surrounding wall surrounding the motor axis and having an inner circumferential surface. The surrounding wall includes a plurality of notches formed in the inner circumferential surface of the surrounding wall parallel to the motor axis and angularly spaced apart at equal intervals relative to the motor axis. Each of the magnetic yokes includes a plurality of excitation fingers inserted respectively in the notches. The excitation fingers of one of the magnetic yokes are alternately disposed with the excitation fingers of the other one of the magnetic yokes in the coil support.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
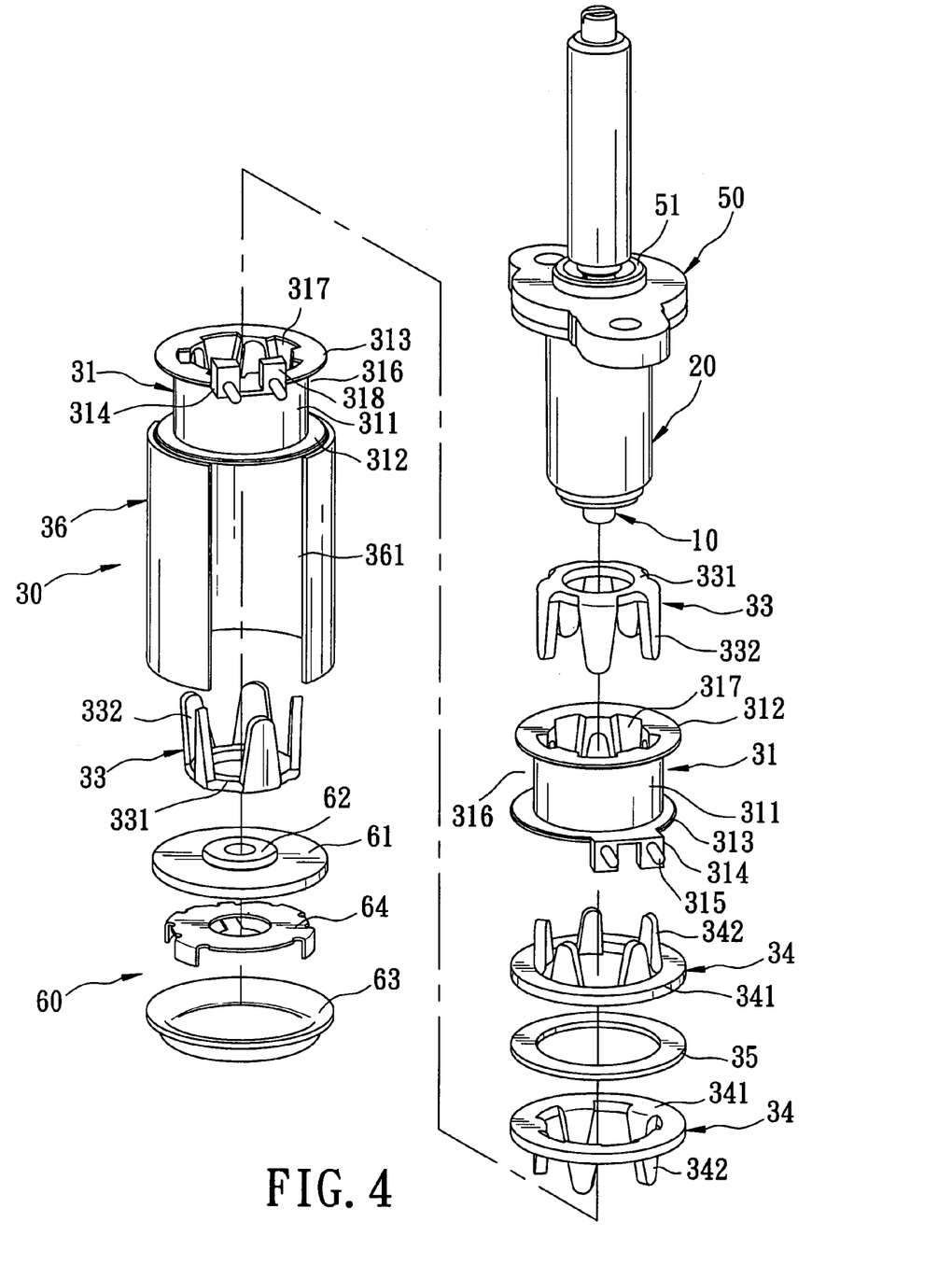
FIG. 4 is an exploded perspective view of a step motor having a stator with a separated structure according to a preferred embodiment of the present invention.
Figure 5:
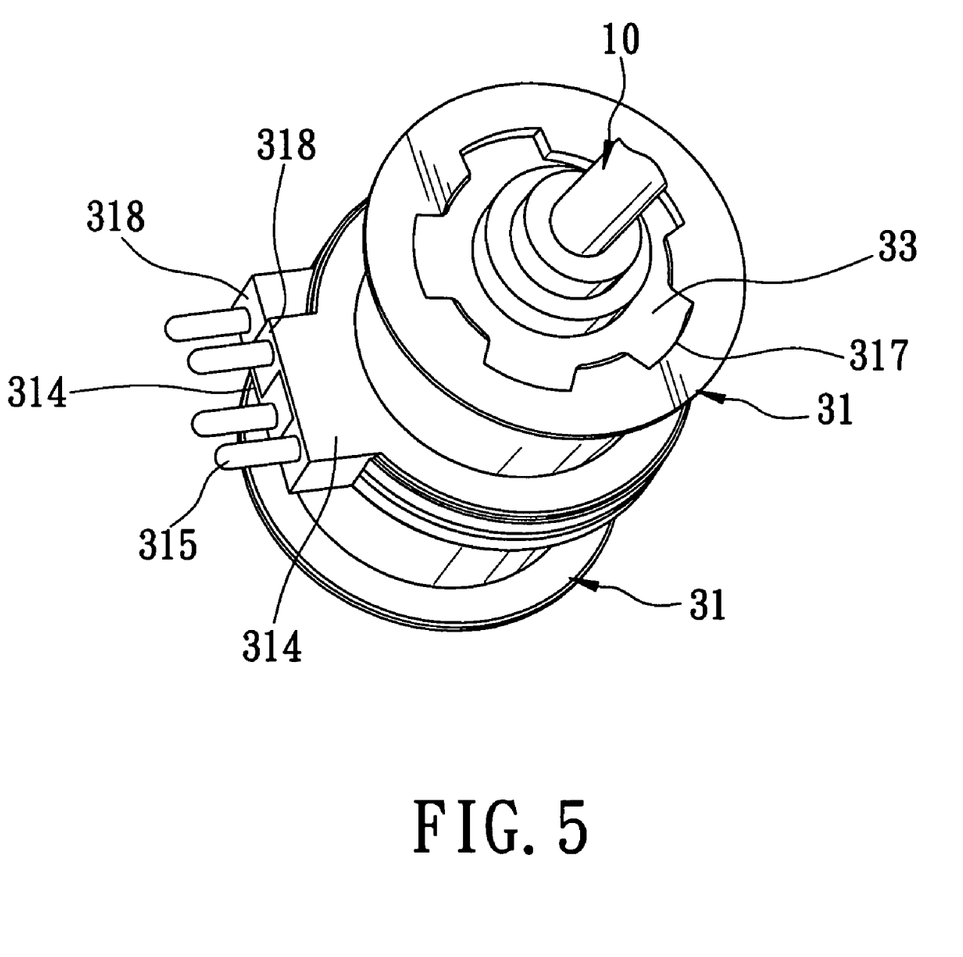
FIG. 5 is a fragmentary assembled perspective view of the step motor of FIG. 4.
Figure 6:
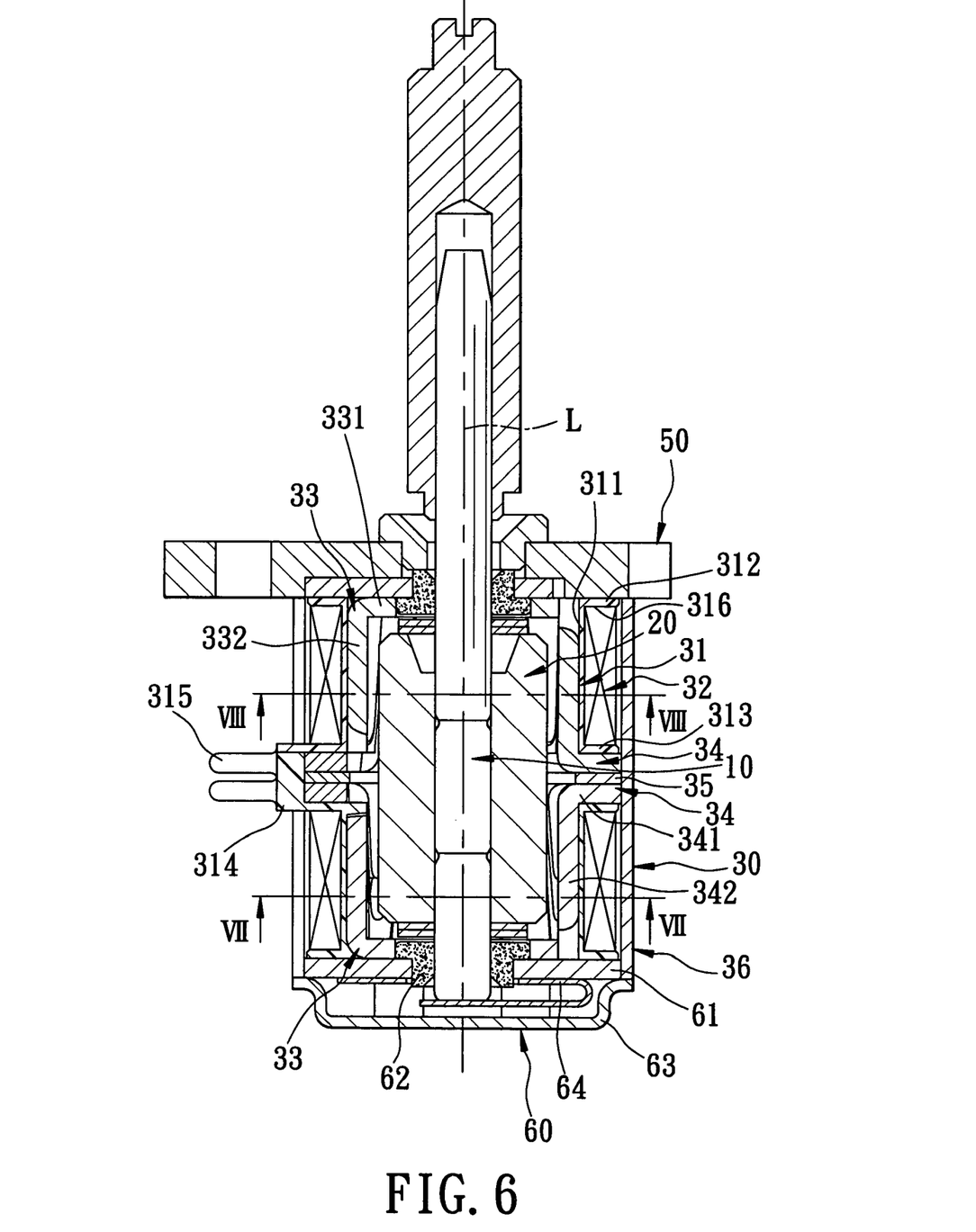
FIG. 6 is an assembled sectional view of the step motor of FIG. 4.

Referring to FIGS. 4, 5, and 6, a step motor with a stator having a separated structure according to a preferred embodiment of the present invention includes a spindle 10, a magnet unit 20 mounted around the spindle 10, a stator assembly 30 sleeved over the magnet unit 20 and having opposite ends, a fixing plate 50 secured to one of the ends of the stator assembly 30, and a cover unit 60 secured to the other one of the ends of the stator assembly 30.

The spindle 10 is formed as a cylindrical shaft, and extends along a motor axis (L).

Figure 7:
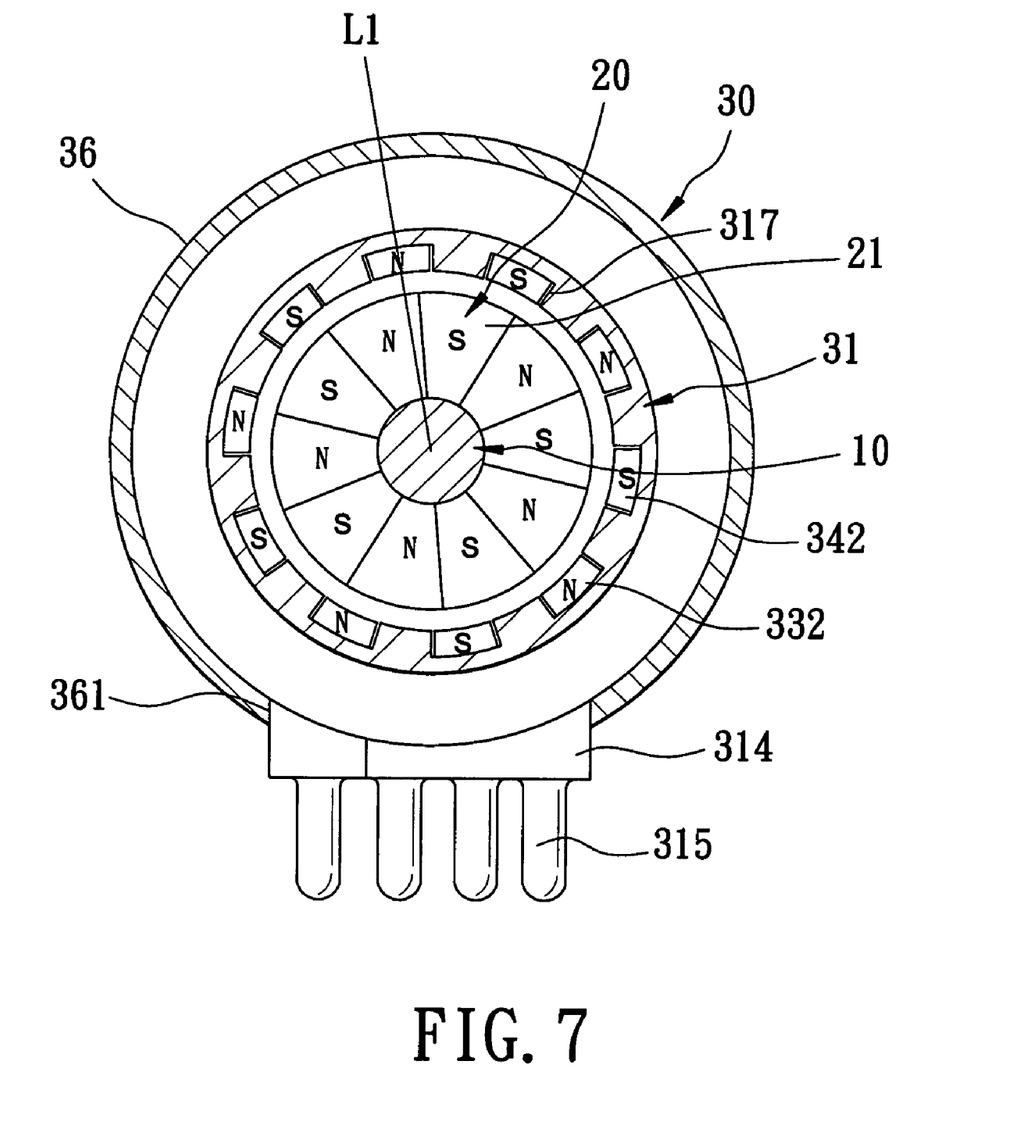
FIG. 7 is a sectional view taken along line VII-VII of FIG. 6.
Figure 8:
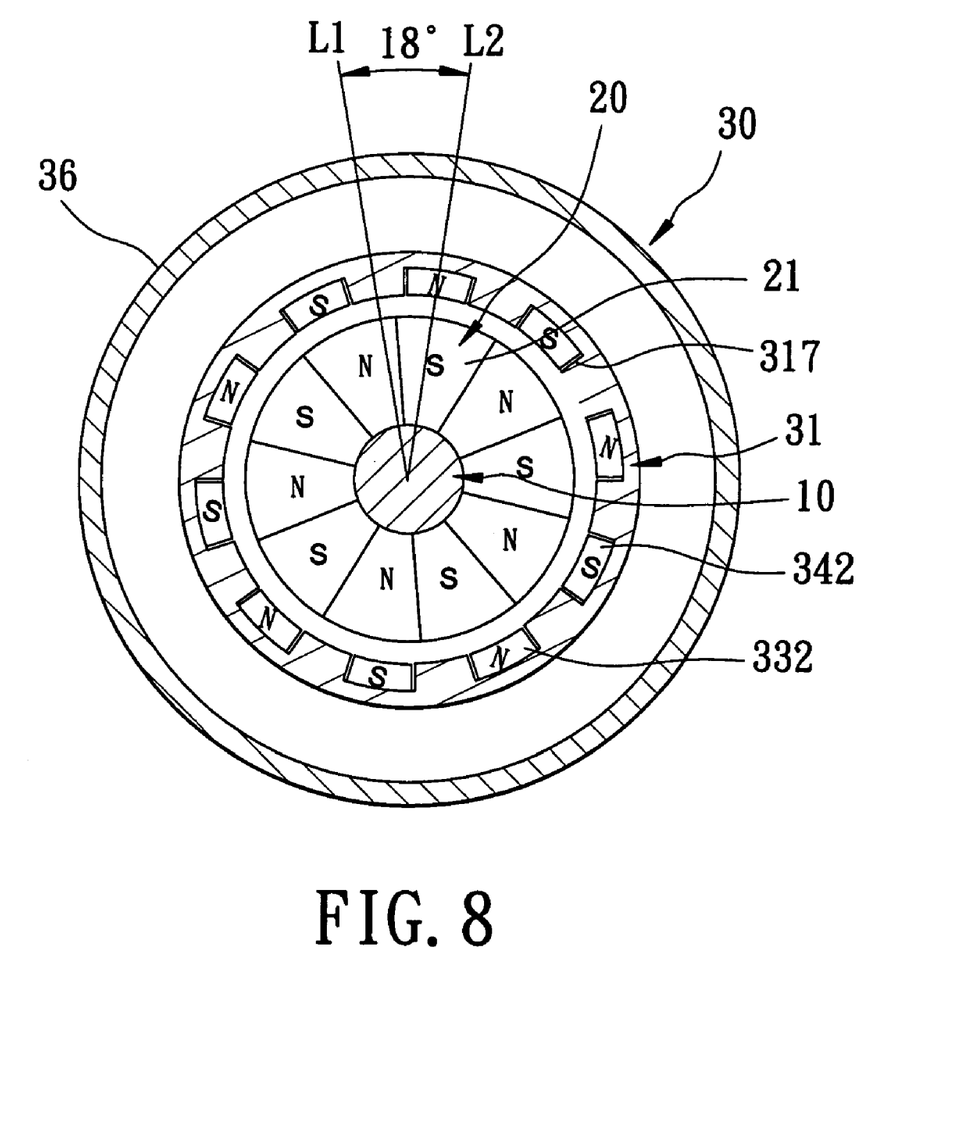
FIG. 8 is a sectional view taken along line VIII-VIII of FIG. 6.

The magnet unit 20, with reference to FIGS. 7 and 8, includes a plurality of magnets 21 interlocked around the spindle 10 to thereby surround the motor axis (L). The magnets 21 are mounted such that their poles are alternating.

The stator assembly 30 of the preferred embodiment includes at least one coil-and-yoke unit having a coil support 31 arranged about the motor axis (L) and with an inner end and an outer end, a coil 32 wound around the coil support 31, a first magnetic yoke 33 inserted into the coil support 31 from the outer end thereof, and a second magnetic yoke 34 inserted into the coil support 31 from the inner end thereof.

In the preferred embodiment, the stator assembly 30 includes a pair of the coil-and-yoke units, and further includes a washer 35 interposed between the second magnetic yokes 34 of the pair of the coil supports 31 (referred hereinafter also as upper and lower coil supports 31), and an outer tube 36 sleeved over the coil-and-yoke units.

The coil supports 31 are hollow and generally cylindrical in shape. Each of the coil supports 31 includes a surrounding wall 311 formed surrounding the motor axis (L), and having an outer end and an inner end, and an inner circumferential surface. Each of the coil supports 31 further includes a first flange 312 extending outwardly from the outer end of the surrounding wall 311, a second flange 313 extending outwardly from the inner end of the surrounding wall 311, a positioning tab 314 extending from an outer edge of the second flange 313 in a direction toward the adjacent one of the coil supports 31, and a pair of conductive pin contacts 315 mounted on the positioning tab 314 and connected electrically to the coil 32. The positioning tab 314 of each of the coil supports 31 is provided with a pair of locking teeth 318 on which the conductive pin contacts 315 are respectively mounted. The locking teeth 318 of one of the coil supports 31 interlock with the locking teeth 318 of the other one of the coil supports 31 to thereby prevent rotational movement of the coil supports 31 relative to one another. The surrounding wall 311 and the first and second flanges 312, 313 of each of the coil supports 31 define a coil groove 316 thereamong, and the respective one of the coils 32 is positioned in the coil groove 316.

The surrounding wall 311 includes a plurality of notches 317 formed in the inner circumferential surface thereof parallel to the motor axis (L). The notches 317 are angularly spaced apart at equal intervals relative to the motor axis (L), and each is tapered (i.e., a width of the notches 317 measured along a circumferential direction of the surrounding wall 311 is gradually decreased along a length of the notches 317). For each of the coil supports 31, adjacent ones of the notches 317 are tapered in the opposite direction.

Each of the first magnetic yokes 33 includes a first annular segment 331, and a plurality of first excitation fingers 332 extending generally parallel to the motor axis (L) from an outer periphery of the first annular segment 331. The first annular segment 331 of each of the first magnetic yokes 33 corresponds in location to the first flange 312 of the respective coil support 31. Further, the first excitation fingers 332 of each of the first magnetic yokes 33 are formed as tapered plates corresponding to the shape of alternate ones of the notches 317 to enable insertion of the first magnetic yokes 33 respectively in the coil supports 31 starting from the outer ends thereof. In the preferred embodiment, each of the first magnetic yokes 33 includes five of the first excitation fingers 332.

Each of the second magnetic yokes 34 includes a second annular segment 341, and a plurality of second excitation fingers 342 extending generally parallel to the motor axis (L) from an inner periphery of the second annular segment 341. The second annular segments 341 of the second magnetic yokes 34 are interposed between the second flanges 313 of the coil supports 31. The second excitation fingers 342 of each of the second magnetic yokes 33 are formed as tapered plates corresponding to the shape of alternate ones of the notches 317 to enable insertion of the second magnetic yokes 34 respectively in the coil supports 31 starting from the inner end thereof. In the preferred embodiment, each of the second magnetic yokes 34 includes five of the second excitation fingers 342.

With reference to FIGS. 7 and 8, for each of the coil supports 31, the five first and second excitation fingers 332, 342 of each of the first and second magnetic yokes 33, 34 are interdigitated in an alternating configuration, and are angularly spaced apart at approximately equal angles (i.e., 36 degrees in the case of five of the first and second excitation fingers 332, 342).

Further, so that the step angle may be made smaller, the first and second excitation fingers 332, 342 of one pair of the first and second magnetic yokes 33, 34 mounted in one of the coil supports 31 are staggered at a predetermined angle of 18 degrees with respect to the first and second excitation fingers 332, 342 of the pair of the first and second magnetic yokes 33, 34 of the other one of the coil supports 31. Stated differently, the notches 317 of one of the coil supports 31 are alternately disposed at a predetermined phase angle of 18 degrees from the notches 317 of the other one of the coil supports 31. This configuration can be seen by viewing FIGS. 7 and 8 in combination. As shown in FIG. 7, a radial line (L1) is drawn through a center one of the first and second excitation fingers 332, 342 of the lower coil support 31, and, as shown in FIG. 8, a radial line (L2) is drawn through a center of a circumferentially adjacent one of the first and second excitation fingers 332, 342 of the upper coil support 31. The angular distance between the radial lines (L1, L2) relative to the motor axis (L) is approximately 18 degrees as indicated in FIG. 8.

The outer tube 36 is formed as a hollow cylindrical element having a slot 361 formed along a length thereof, i.e., along a direction parallel to the motor axis (L). The slot 361 provides a space for location of the positioning tabs 314 of the coil supports 31 when the outer tube 36 is sleeved over the coil supports 31, thereby preventing rotation of the coil supports 31 about the motor axis (L) and allowing for electrical coupling of an external circuit (not shown) to the conductive pin contacts 315.

The fixing plate 50 may be secured to the outer tube 36 by welding. The fixing plate 50 includes an inner cover 51 sleeved on the spindle 10 to be thereby interposed between the spindle 10 and the remainder of the fixing plate 50.

The cover unit 60 is mounted on an opposite end of the outer tube 36 as the fixing plate 50, and the spindle 10 is journalled within cover unit 60. The cover unit 60 may be fixed to the outer tube 36 by welding. The cover unit 60 includes a bottom plate 61 mounted within the outer tube 36, abutting against the first flange 312 of the lower coil support 31, and having a hollow center portion, a sleeve 62 mounted in the hollow center portion of the bottom plate 61 and in which the spindle 10 is journalled, a seal cover 63 secured to the outside of the outer tube 36, and a spring plate 64 interposed between the bottom plate 61 and the seal cover 63 and providing a biasing force to the spindle 10 along the direction of the motor axis (L).

To assemble the step motor, the first and second excitation fingers 332, 342 of the first and second magnetic yokes 33, 34 are inserted into each of the coil supports 31 from opposite sides thereof and by insertion respectively into the notches 317. Next, the coil supports 31 are aligned along the motor axis (L) with the washer 35 interposed therebetween, and the spindle 10 and the magnet unit 20 are received in the coil supports 31. The positioning tabs 314 of the coil supports 31 are interlocked to thereby interconnect the coil supports 31.

Subsequently, the coils 32 are wound around the coil supports 31 to be positioned in the coil grooves 316 thereof. The outer tube 36 is then sleeved over the coil supports 31, the coils 32, and the first and second magnetic yokes 33, 34 such that the positioning tabs 314 are located in the slot 361 of the outer tube 36. Finally, the fixing plate 50 and the cover unit 60 are respectively secured to opposite ends of the outer tube 36 to thereby complete assembly of the step motor.

Following assembly, the first and second excitation fingers 332, 342 of the first and second magnetic yokes 33, 34 positioned in the coil supports 31 are provided angularly spaced apart as described above, with the first and second excitation fingers 332, 342 between the two coil supports 31 being provided at the predetermined phase angle.

The present invention has the following advantages:

1. The first and second magnetic yokes 33, 34, the coil supports 31, and the outer tube 36 are all provided in a separated configuration. As a result, manufacture of the first and second magnetic yokes 33, 34 is easy, and assembly of the first and second magnetic yokes 33, 34, the coil supports 31, and the outer tube 36 does not involve a molding process. Manufacturing costs are reduced as a result.

2. The first and second magnetic yokes 33, 34 are independently mounted. Therefore, the manufacturing processes associated with the first and second excitation fingers 332, 342 are made simpler. Further, following manufacture, finishing processes to control a ratio between cross-sectional areas and lengths of the first and second excitation fingers 332, 342 may be accurately and easily performed, thereby enhancing a magnetic excitation effect and reducing production costs.

3. Using the configuration in which the first and second excitation fingers 332, 342 of the first and second magnetic yokes 33, 34 are inserted respectively into the notches 317 of the coil supports 31, the first and second excitation fingers 332, 342 for each of and between the two coil supports 31 are uniformly distributed. Hence, step precision is ensured in the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A step motor, comprising:
a spindle that extends along a motor axis;
a magnet unit mounted around said spindle;
a stator assembly sleeved over said magnet unit and having opposite ends, and including at least one coil-and-yoke unit having a coil support, a coil wound around said coil support, and a pair of magnetic yokes mounted in said coil support, said stator assembly further including an outer tube sleeved over said coil-and-yoke unit;
a fixing plate mounted to one of said ends of said stator assembly, and in which said spindle is journalled; and
a cover unit mounted to another one of said ends of said stator assembly opposite to said fixing plate, and in which an end portion of said spindle is journalled;
wherein said coil support includes a surrounding wall surrounding said motor axis and having an inner circumferential surface;
wherein said surrounding wall includes a plurality of notches formed in said inner circumferential surface of said surrounding wall parallel to said motor axis and angularly spaced apart at equal intervals relative to said motor axis, each of said magnetic yokes including a plurality of excitation fingers inserted respectively in said notches; and
wherein said excitation fingers of one of said magnetic yokes are alternately disposed with said excitation fingers of the other one of said magnetic yokes in said coil support,
wherein said cover unit includes a bottom plate mounted in said outer tube, abutting against said coil support, and having a hollow center portion, a sleeve mounted in said hollow center portion of said bottom plate and in which said spindle is journalled, a seal cover secured to said outer tube, and a spring plate interposed between said bottom plate and said seal cover and providing a biasing force to said spindle along the direction of said motor axis.

2. The step motor of claim 1, wherein said coil support further includes a positioning tab protruding outwardly from said surrounding wall, said outer tube including a slot extending along a length of said outer tube, said positioning tab of said coil support being positioned in said slot.

3. The step motor of claim 2, wherein said stator assembly includes a pair of said coil-and-yoke units, said positioning tab of said coil support of each of said coil-and-yoke unit being provided with locking teeth, said locking teeth of one of said coil supports interlocking with said locking teeth of the other one of said coil supports.

4. The step motor of claim 3, wherein said notches of one of said coil supports are alternately disposed at a predetermined phase angle from said notches of the other one of said coil supports.

5. The step motor of claim 2, wherein said coil support further includes a conductive pin contact mounted on said positioning tab and connected electrically to said coil.

6. The step motor of claim 2, wherein said coil support is cylindrical in shape.

7. The step motor of claim 6, wherein said surrounding wall of said coil support has two ends, said coil support including a pair of flanges extending outwardly and respectively from said two ends of said surrounding wall, said positioning tab protruding outwardly from one of said flanges.

8. The step motor of claim 7, wherein said surrounding wall and said flanges cooperate to define a coil groove, said coil being disposed in said coil groove.

9. The step motor of claim 8, wherein each of said magnetic yokes further includes an annular segment having inner and outer peripheries, said excitation fingers extending from one of said inner and outer peripheries of said annular segment parallel to said motor axis.

10. The step motor of claim 9, wherein said annular segment of each of said magnetic yokes corresponds in location to a respective one of said flanges of said coil support.

11. The step motor of claim 9, wherein said stator assembly includes a pair of said coil-and-yoke units, said annular segment of each of said magnetic yokes corresponding in location to a respective one of said flanges of an associated one of said coil supports.

* * * * *